(12) United States Patent
Frediani et al.

(10) Patent No.: US 6,393,351 B2
(45) Date of Patent: May 21, 2002

(54) SYSTEM FOR THE ACTIVE CONTROL OF A MOTOR VEHICLE DIFFERENTIAL

(75) Inventors: Salvatore Frediani, Aosta; Renato Gianoglio, Turin; Fulvio Giuliano, Vinovo, all of (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 0 days.

(21) Appl. No.: 09/871,728

(22) Filed: Jun. 4, 2001

(30) Foreign Application Priority Data

Jun. 5, 2000 (IT) ......................................... TO00A0528

(51) Int. Cl.[7] ................................................ B62D 5/04
(52) U.S. Cl. ........................................ 701/69; 180/197
(58) Field of Search .......................... 701/69; 180/197, 180/241, 245, 248; 280/91.1

(56) References Cited

U.S. PATENT DOCUMENTS

| | | | | |
|---|---|---|---|---|
| 4,840,389 A | * | 6/1989 | Kawabe et al. | ............. 180/241 |
| 5,267,160 A | * | 11/1993 | Ito et al. | ...................... 180/241 |
| 5,375,097 A | * | 12/1994 | Ackermann | ................... 280/91 |
| 5,805,449 A | * | 9/1998 | Ito | .............................. 701/69 |

FOREIGN PATENT DOCUMENTS

| | | |
|---|---|---|
| EP | 0 548 853 B1 | 5/1996 |
| EP | 0 662 402 B1 | 3/1998 |

* cited by examiner

Primary Examiner—Richard M. Camby
(74) Attorney, Agent, or Firm—Sughrue Mion, PLLC

(57) ABSTRACT

The system comprises:
devices operable to provide signals indicative of the angle of rotation of the steering wheel, the speed and the yaw rate of the vehicle, at well as the longitudinal acceleration and transverse acceleration of the vehicle on the basis of which a reference yaw rate is determined. A first yaw torque control signal is produced on the basis of a predetermined mathematical model of the behaviour of the motor vehicle and as a function of the determined reference value of the yaw rate. Control devices generate a second yaw torque control signal as a predetermined function of the longitudinal acceleration of the vehicle. A control circuit generates electrical piloting signals for actuator devices of the differential as a function of the first and second yaw rate control signals.

9 Claims, 5 Drawing Sheets

SYSTEM FOR THE ACTIVE CONTROL OF A MOTOR VEHICLE DIFFERENTIAL

BACKGROUND OF THE INVENTION

The present invention relates to a system for the active control of a motor vehicle differential.

More specifically, the subject of the invention is a system for controlling a differential comprising an inlet shaft intended to transmit torque to two output shafts or half-shafts associated with respective wheels of the motor vehicle, and selective coupling means controllable by means of corresponding actuator devices to modify the division of torque between said half-shafts.

Differentials of this type are described for example in European Patent Application 92121621.4 and European Patent Application 94120782.1.

SUMMARY OF THE INVENTION

One object of the present invention is to provide a system for controlling such a differential, which makes it possible to increase the stability of the motor vehicle and give optimum control of the division of the load between the inner wheel and the outer wheel on bends.

These and other objects are achieved according to the invention with a control system the essential characteristics of which are defined in the attached claim 1.

BRIEF DESCRIPTION OF THE DRAWINGS

Further characteristics and advantages of the invention will become apparent from the following detailed description, given purely by way of example, with reference to the attached drawings, in which.

DETAILED DESCRIPTION OF THE INVENTION

Figure 1:
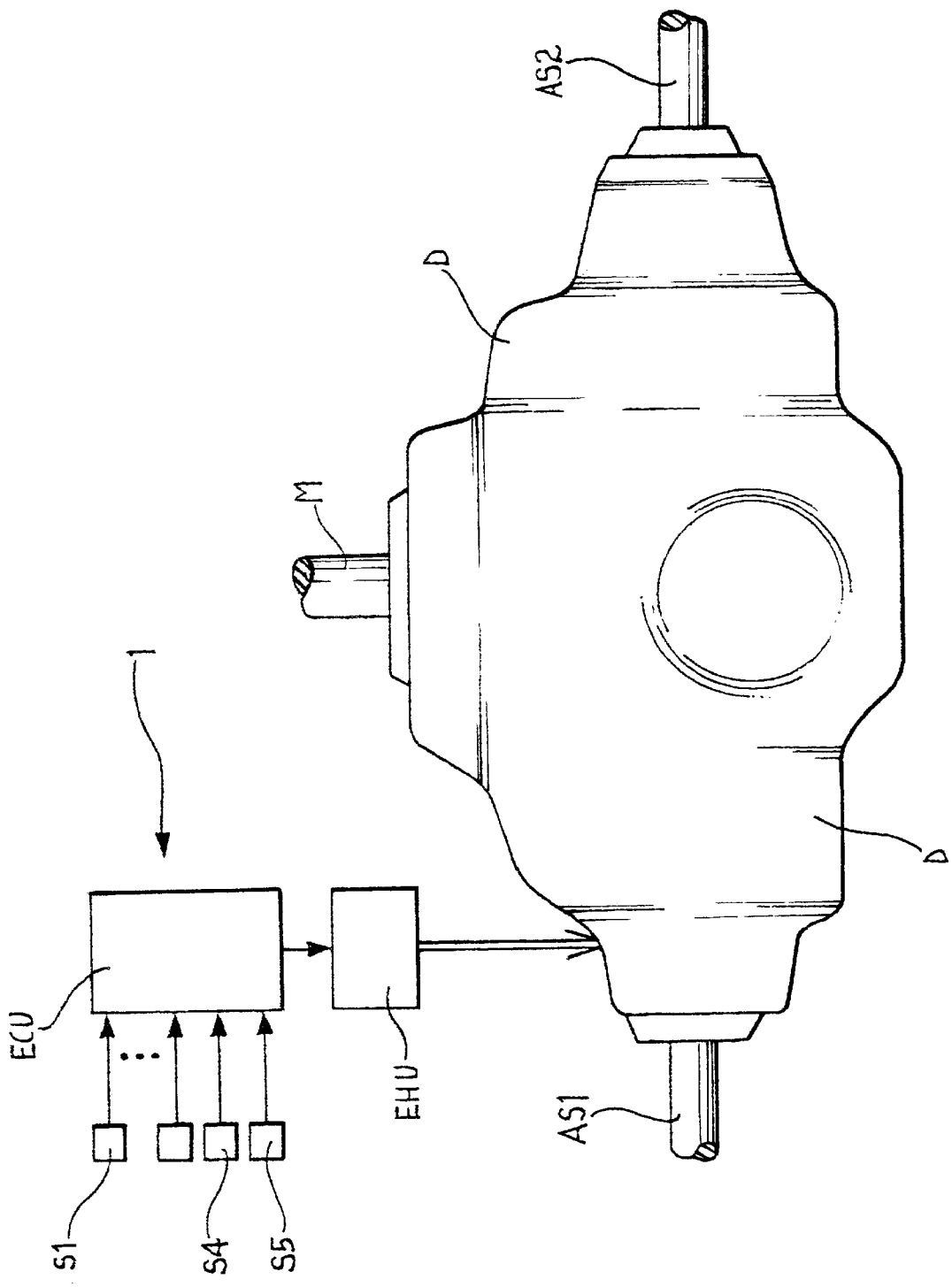
FIG. 1 shows a motor vehicle differential with which a control system according to the invention is associated.

In FIG. 1 a motor vehicle differential, for example of the type described in detail in the prior art documents described above, is generally indicated D.

The differential D comprises an inlet shaft M, intended to transmit torque from the engine (not illustrated) to two output shafts or half-shafts (AS1 and AS2) associated with respective driven wheels (also not illustrated) of the motor vehicle.

Figure 2:
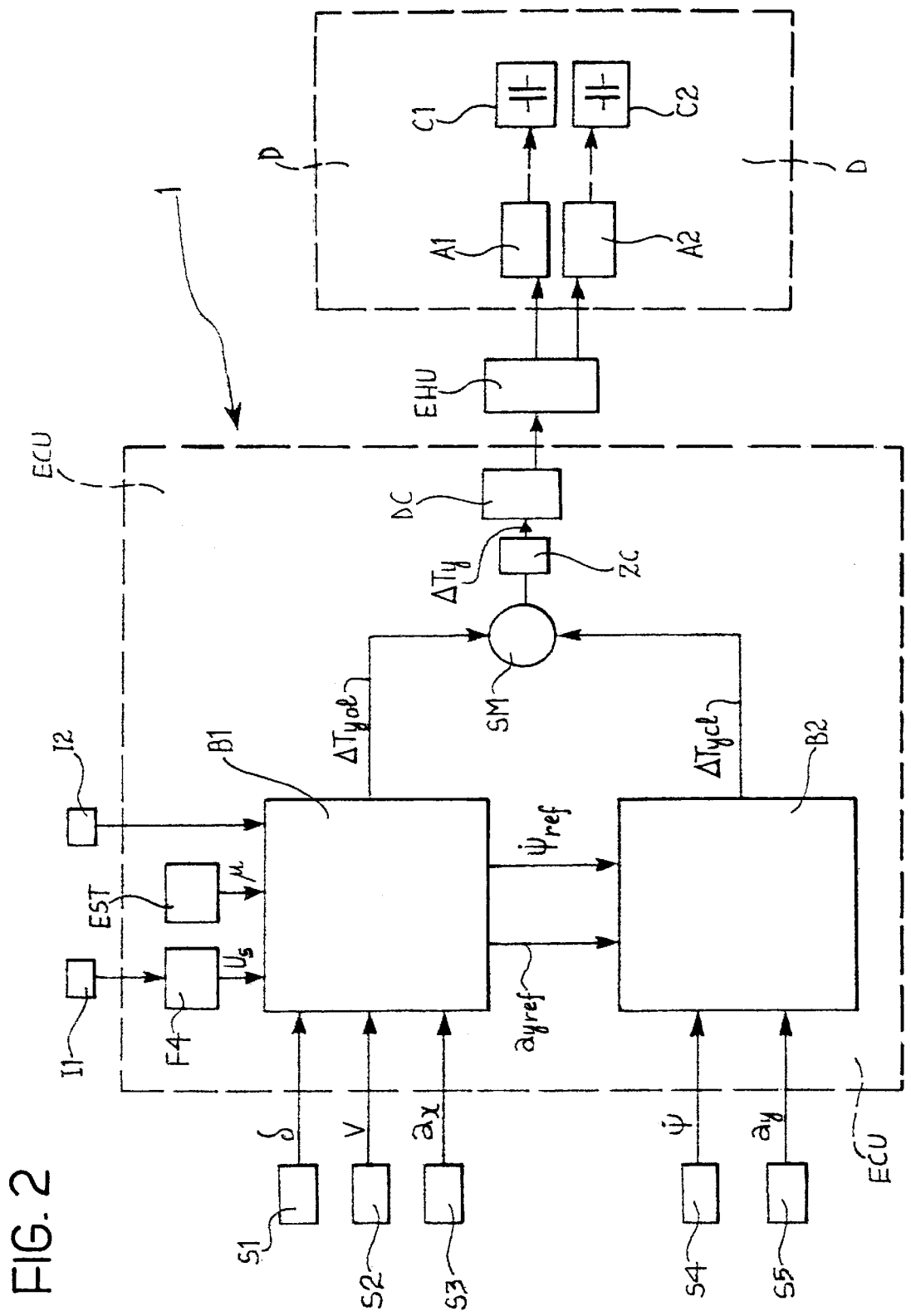
FIG. 2 is a block diagram of a control system according to the invention.

In a manner known per se the differential D comprises a plurality of friction clutches (not illustrated in FIG. 1 but schematically shown in FIG. 2 indicated there C1 and C2) selectively controllable by use of corresponding actuator devices (also not illustrated in FIG. 1, but schematically shown in FIG. 2 where they are indicated A1 and A2). These actuator devices are, for example, hydraulic cylinders piloted by an electro-hydraulic unit such as that schematically shown in FIGS. 1 and 2 where it is indicated EHU.

This electro-hydraulic unit is in turn controlled by a control system generally indicated 1 in FIGS. 1 and 2.

This control system can for example comprise an electronic unit ECU having a plurality of inputs which are provided with respective input signals representative of the values assumed by corresponding quantities. These input signals can be provided to the unit ECU by suitable sensors installed on board the motor vehicle, and/or by other electronic control units installed on board the motor vehicle and connected to the unit ECU of interest here by means of a line or communication network according to techniques known per se. Hereinafter in the present description the signals applied to the inputs of the unit ECU will be assumed to be provided from corresponding sensors or transducers.

With reference to FIG. 2, signals provided from sensors S1 to S5 are applied to the unit ECU of the control system 1 shown here.

The sensors S1 and S2 provide the unit ECU with respective signals indicative of the steering angle $\delta$ (the angle of rotation of the steering wheel) and the speed V of the vehicle.

The sensors S3 and S5 provide the unit ECU with respective signals indicative of the longitudinal acceleration $a_x$ and transverse acceleration $a_y$ respectively of the vehicle.

Sensor S4 provides the unit ECU with a signal indicative of the yaw rate $\dot{\Psi}$.

Sensor S4 is for example a so-called gyroscope or gyrometer.

In the embodiment schematically illustrated in FIG. 2 the unit ECU comprises two main processor blocks B1 and B2 which are connected to sensors S1–S3 and, respectively, the sensors S4 and S5.

Possible structural forms or architectures for the blocks B1 and B2 will be described in more detail with reference to FIGS. 3 and 6.

As will become more clearly apparent hereinafter, the processor blocks B1 and B2 are arranged to generate respective yaw torque control signals $\Delta T_{yo1}$ and $\Delta T_{ycl}$, which are added in a summing device SM which, following a filter ZC, provides an output control signal $\Delta T_y$ to a driver circuit DC which, via the electro-hydraulic unit EHU controls the actuators A1 and A2 of the differential D.

Figure 3:
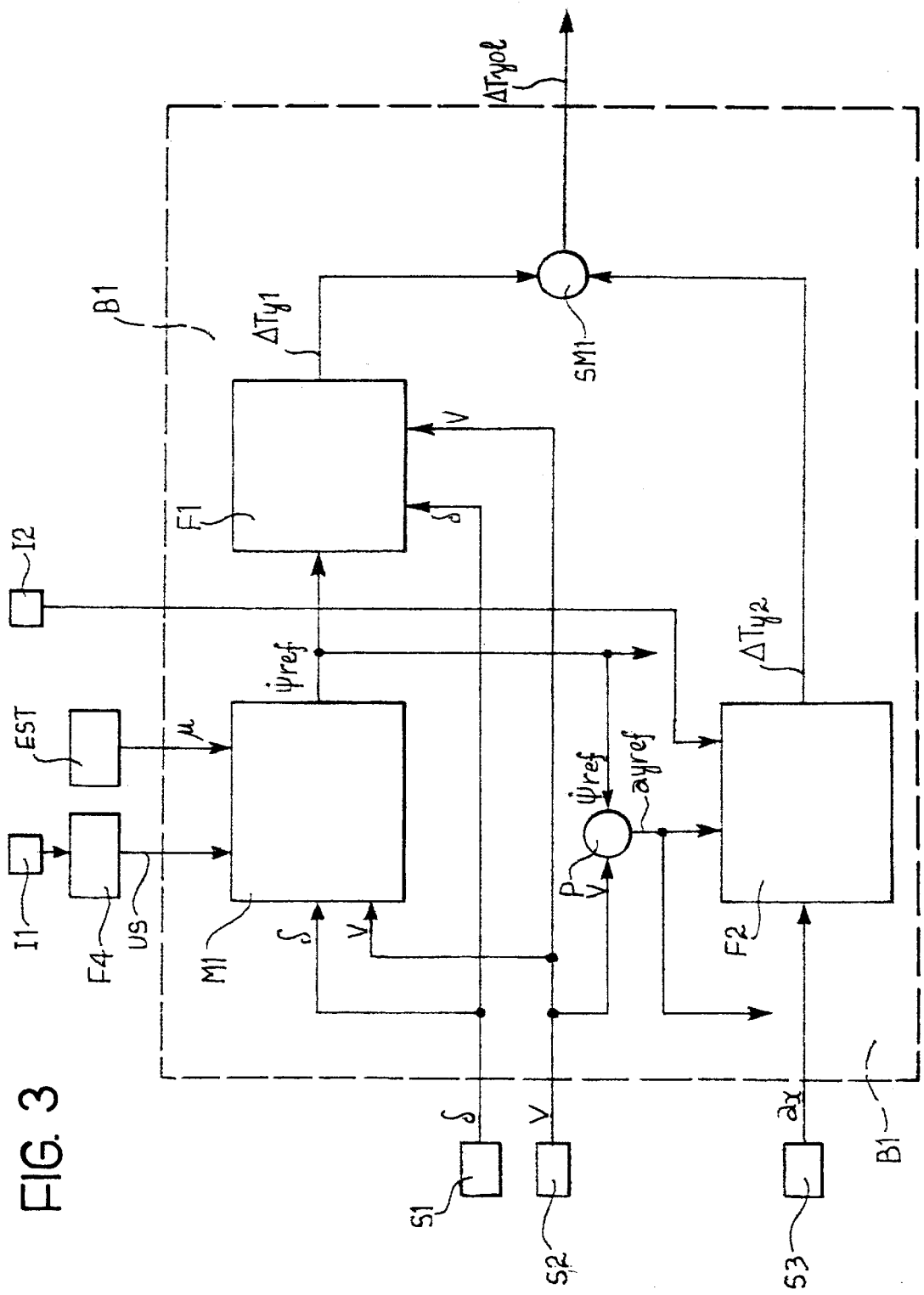
FIG. 3 is a block diagram which shows a possible structure or architecture of a first part of the control system according to the invention.
Figure 4:
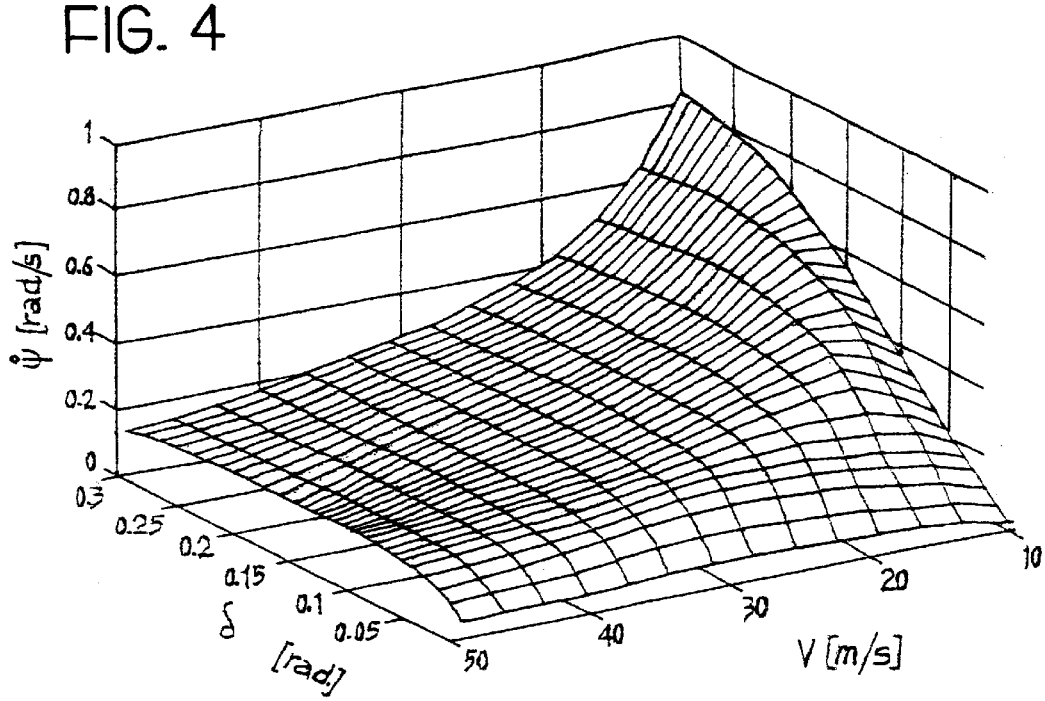
FIG. 4 is a three-dimensional diagram which shows exemplary values of the yaw rate as a function of the angle of rotation of the steering wheel and the speed of the vehicle.

With reference to FIG. 3, the block B1 comprises a memory M1 in which are stored pre-determined reference values of the yaw rate $\dot{\Psi}_{ref}$ addressable on the basis of the instantaneous values of the steering angle $\delta$ and the vehicle speed V. In the memory M1 reference values of the yaw rate are tabulated as shown in the three dimensional graph of FIG. 4. The memory M1 is connected to a processor section F1 which equally receives signals indicative of the steering angle $\delta$ and the vehicle speed V. The processor section F1 is arranged to generate a first signal $\Delta T_{y1}$ for control of the yaw torque on the basis of a pre-determined mathematical model of the behaviour of the motor vehicle, and as a function of the value of $\dot{\Psi}_{ref}$.

The block B1 further includes a second processor section F2 which receives the signal provided by the sensor S3 indicative of the longitudinal acceleration $a_x$ of the motor vehicle, as well as a lateral or transverse acceleration reference value $a_{yref}$. This reference value $a_{yref}$ is provided at the output of a multiplier device P the inputs of which receive the signals indicative of the motor vehicle speed V and the reference value $\dot{\Psi}_{ref}$ of the yaw rate.

Alternatively, the signal indicative of the longitudinal acceleration $a_x$ can be obtained by differentiating the signal provided from the sensor S2 which is indicative of the motor vehicle speed V.

The processor section F2 is arranged to generate a second yaw torque control signal $\Delta T_{y2}$ in dependence on a predetermined function of the longitudinal acceleration $a_x$ of the vehicle. The signal $\Delta T_{y2}$ is for example proportional to the product of the longitudinal acceleration $a_x$ and the lateral acceleration reference value $a_{yref}$.

The signals $\Delta T_{y1}$ and $\Delta T_{y2}$ are delivered to the inputs of a summing device SM1 at the output of which there is therefore available a sum signal $\Delta T_{yo1}$.

The above-described processor block B1 performs an open loop control on the yaw torque acting on the motor vehicle whilst, as will be seen hereinafter, the processor block B2 performs a closed loop control.

Figure 5:
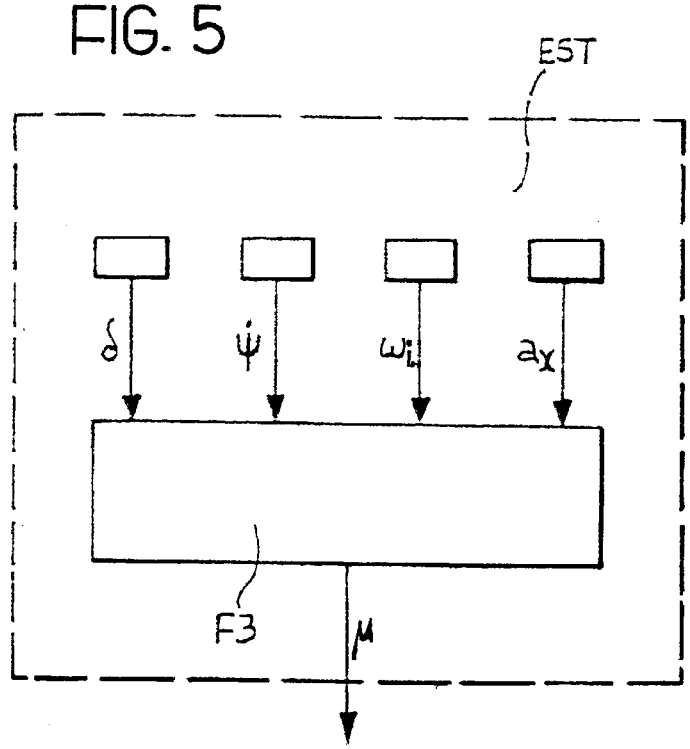
FIG. 5 is a block diagram of a portion of the system of FIGS. 2 and 3.

Still with reference to block B1, the memory M1 can store yaw torque reference values $\Psi_{ref}$ not just as a function of the steering angle $\delta$ and the vehicle speed V, but rather as a function also of the value of the co-efficient of friction $\mu$ between the tires of the motor vehicle and the road surface as calculated by an estimator device generally indicated EST in FIGS. 2, 3 and 5. With reference in particular to this latter figure, the estimator EST comprises a processor section F3 arranged to calculate, or rather estimate, the value of $\mu$ on the basis of values of steering angle $\delta$, the yaw rate $\dot{\Psi}$, the speed $\omega_i$ of the motor vehicle wheels, and the longitudinal acceleration $a_x$.

The reference values $\dot{\Psi}_{ref}$ in the memory M1 can also be stored as a function of the values of a further parameter, represented by an understeer index US computed by a further processor section F4 taking into account the understeer gradient desired by the user and set thereby by means of a setting device indicated I in FIGS. 2 and 3.

The processor section F4 can be arranged to recognise, on the basis of the values assumed by a plurality of input signals, the driving "style" of the user in a continuous learning process.

In FIGS. 2 and 3 there is indicated a further setting device indicated I2, by means of which the user is able to cause a variation of the law with which the processor section F2 produces the signal $\Delta T_{y2}$ as a function of the longitudinal acceleration $a_x$.

Figure 6:
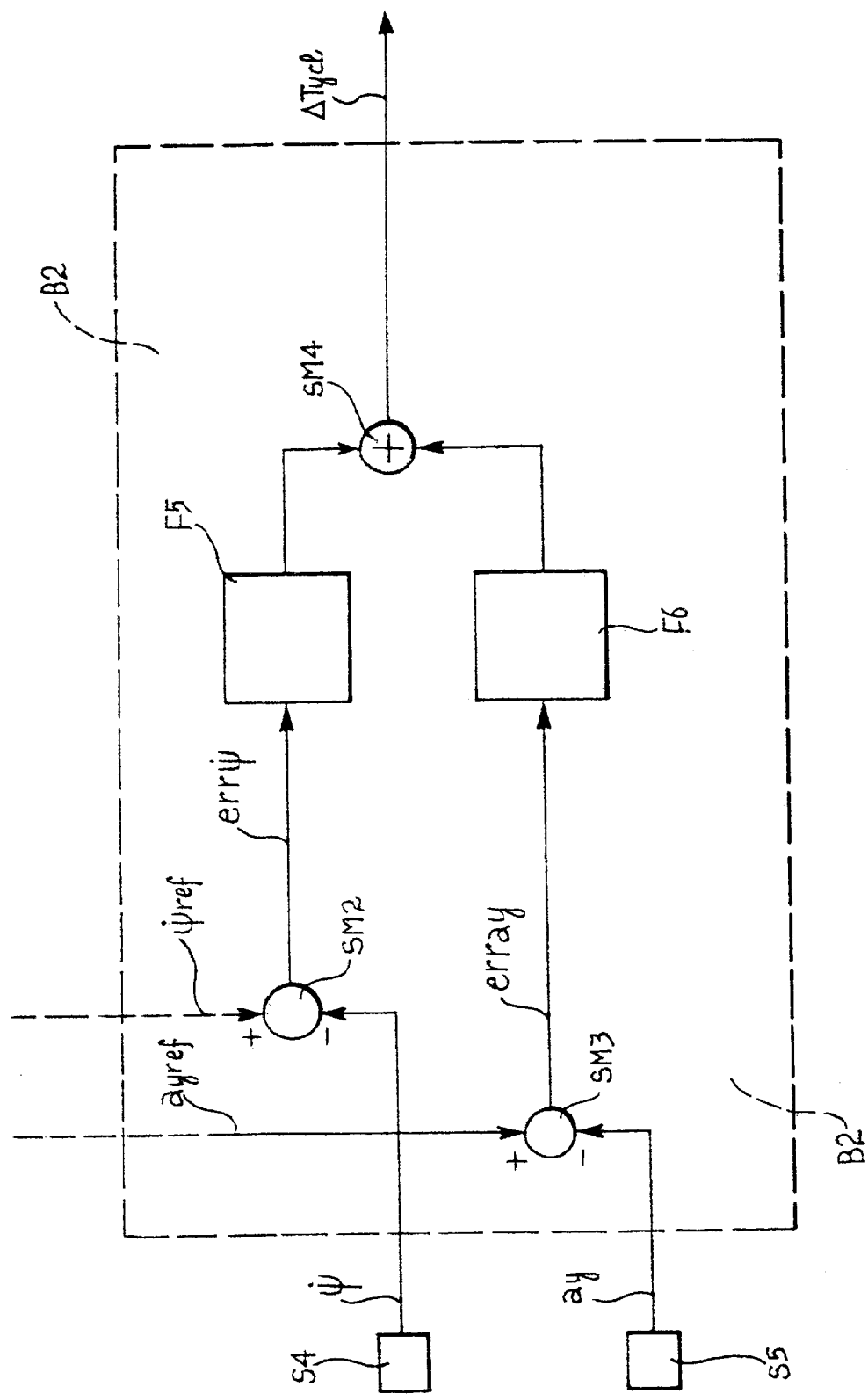
FIG. 6 is a block diagram of a second part of the control system of FIG. 2.

With reference to FIGS. 2 and 6, the processor block B2 receives signals indicative of the yaw rate $\dot{\Psi}$ and the lateral acceleration $a_y$. This block also receives from the processor block B1 the lateral acceleration reference value $a_{yref}$ and the yaw rate reference value $\dot{\Psi}_{ref}$.

In block B2 two summing units SM2 and SM3 provide two output error signals err $\dot{\Psi} = \dot{\Psi}_{ref} - \dot{\Psi}$ and err $a_y = a_{yref} - a_y$ to two control blocks F5 and F6 respectively, which perform respective predetermined transfer functions to operate, for example, a proportional-integral-differential type of control.

The outputs from blocks F5 and F6 lead to a summing unit SM4 the output of which represents the control signal $\Delta T_{ycl}$.

The system described above allows an optimum control of the stability of the vehicle and control of the division of the torque when the vehicle is travelling in the bend with a progressive transfer of torque from the inner wheels facing the center of the curve to the outer wheels.

The system further allows understeer behaviour with the possibility of the user deciding the magnitude of the understeer effect.

Naturally, the principle of the invention remaining the same, the embodiments and details of construction can be widely varied with respect to what has been described and illustrated purely by way of non-limitative example, without by this departing from the ambit of the invention as defined in the following claims.

What is claimed is:

1. A system for the active control of a motor vehicle differential comprising an input shaft intended to transmit torque to two output shafts or half-shafts associated with respective different wheels of the motor vehicle, and coupling means selectively controllable by means of corresponding actuators for modifying the division of the torque between the half-shafts; the control system being characterised in that it comprises:

generator means operable to provide signals indicative of the angle of rotation of the steering wheel, the speed of the vehicle, the yaw rate of the vehicle, as well as the longitudinal acceleration and transverse acceleration of the vehicle;

first control means operable to determine a reference yaw rate value as a function of the values of the angle of rotation of the steering wheel and the speed of the vehicle, and to generate a first signal for controlling the yawing torque on the basis of a predetermined mathematical model of the behaviour of the motor vehicle and as a function of the determined reference value of the yaw rate, second control means arranged to generate a second signal for controlling the yawing couple as a predetermined function of the longitudinal acceleration of the vehicle, and control circuit means means arranged to generate electrical signals for piloting the said actuator devices as a function of the said first and second yaw rate control signals.

2. A control system according to claim 1, in which the control circuit means are arranged to generate electrical pilot signals for the actuator devices as a function of the sum of the said first and second yaw rate control signals.

3. A control system according to claim 1, further comprising third control means arranged to generate a third control signal for the yaw torque as predetermined functions of the difference between the yaw rate and the associated reference value, as well as the difference between the lateral acceleration of the vehicle and an associated reference value.

4. A control system according to claim 3, in which the transverse acceleration reference value is determined essentially as the product of the speed of the vehicle and the yaw rate reference value.

5. A control system according to claim 3, in which the said second yaw torque control signal is substantially indicative of the product of the longitudinal acceleration of the vehicle and the reference value of the lateral acceleration of the vehicle.

6. A control system according to claim 1, in which there are further provided estimator means arranged to estimate the coefficient of friction between the tires and the road surface, and in which the said first control means are arranged to determine the reference value of the yaw rate also as a function of the estimated value of the said coefficient friction.

7. A control system according to claim 6, in which the said estimator means are arranged to estimate the said coefficient of friction on the basis of values of the angle of rotation of the steering wheel, the yaw rate, the longitudinal acceleration of the vehicle and the speed of rotation of the vehicle wheels.

8. A control system according to claim 1, in which the said first control means are coupled to setting means operable to provide signals selectively indicative of the desired understeer gradient; the said first control means being arranged to determine the reference value of the yaw rate also as a function of the said understeer gradient.

9. A control system according to claim 1, in which the said second control means are coupled to second setting means operable to provide the said second control means with modification or personalisation signals of the function which correlates this said second yaw torque control signal with the longitudinal acceleration of the vehicle.

* * * * *